US012724003B2

(12) United States Patent
Chang et al.

(10) Patent No.: US 12,724,003 B2
(45) Date of Patent: Sep. 1, 2026

(54) LACTIC ACID DETECTION ELECTRODE AND METHOD FOR PRODUCING THE SAME

(71) Applicant: National Taiwan Normal University, Taipei City (TW)

(72) Inventors: Tien-Li Chang, Taipei City (TW); Qi-Xuan Wu, Taipei City (TW); Song-Pu Huang, Taipei City (TW); Yuan-Jun Chen, Taipei City (TW)

(73) Assignee: NATIONAL TAIWAN NORMAL UNIVERSITY, Taipei City (TW)

( * ) Notice: Subject to any disclaimer, the term of this patent is extended or adjusted under 35 U.S.C. 154(b) by 105 days.

(21) Appl. No.: 18/987,306

(22) Filed: Dec. 19, 2024

(65) Prior Publication Data

US 2026/0092889 A1 Apr. 2, 2026

(30) Foreign Application Priority Data

Sep. 30, 2024 (TW) ................................ 113137228

(51) Int. Cl.
*G01N 27/327* (2006.01)
*G01N 27/414* (2006.01)

(52) U.S. Cl.
CPC ..... *G01N 27/3278* (2013.01); *G01N 27/4145* (2013.01); *G01N 27/4146* (2013.01)

(58) Field of Classification Search
CPC ... G01N 27/327–3272; G01N 27/3278; G01N 27/414; G01N 27/4145; G01N 27/4146
See application file for complete search history.

(56) References Cited

U.S. PATENT DOCUMENTS

2023/0273184 A1 8/2023 Wang

FOREIGN PATENT DOCUMENTS

TW 202238130 A 10/2022

OTHER PUBLICATIONS

Alim, A.A.; Roslan, R.; Nadzirah, S.; Saidi, L.K.; Menon, P.S.; Aziah, I.; Chang Fu, D.; Sulaiman, S.A.; Abdul Murad, N.A.; Hamzah, A.A. Geometrical Characterisation of TiO2-rGO Field-Effect Transistor as a Platform for Biosensing Applications. Micromachines 2023, 14, 1664 (Year: 2023).*

(Continued)

*Primary Examiner* — Alexander S Noguerola
(74) *Attorney, Agent, or Firm* — Li & Cai Intellectual Property (USA) Office

(57) ABSTRACT

A lactic acid detection electrode and a method for producing the lactic acid detection electrode are provided. The lactic acid detection electrode includes a substrate and an electrode pattern formed on the substrate. A surface of the electrode pattern has a surface modification structure, and the surface modification structure has a p-n heterojunction formed between p-type reduced graphene oxide and n-type metal oxide. The electrode pattern includes a first electrode and a second electrode. The first electrode has a first spiral line. The second electrode has a second spiral line. The first spiral line and the second spiral line respectively extend toward each other along a spiral path, and are spirally wound around each other without contacting each other.

10 Claims, 11 Drawing Sheets

(56) References Cited

OTHER PUBLICATIONS

Sardesi et al., "Design and Electrochemical Characterization of Spiral Electrochemical Notification Coupled Electrode (SENCE) Platform for Biosensing Application," Micromachines 2020, 11, 333 (Year: 2020).*

Boubour et al., " The superiority of innovative spiral-interdigital microelectrode pattern in increasing the sensitivity of tracing synchronization via serum starvation in cellular metabolism," natureportfolio—Scientific Reports | (2024) 14:17986. Published Aug. 3, 2024 (Year: 2024).*

Adelyn et al., "Fabrication and Characterization on Width of Spiral Interdigitated Electrodes Based Biosensors," 11th Asian Conference on Chemical Sensors AIP Conf. Proc. 1808, 020039-1-020039-7AIP, (2017) (Year: 2017).*

Navin Chaurasiya, Ajeet Singh, Kuldeep Kumar, Bal Chandra Yadav, Pramod Kumar Yadawa, Sandip Kumar Singh and Kajal Kumar Dey, "A Highly Sensitive Room Temperature Liquefied Petroleum Gas (LPG) Sensor With Fast Response Based on a Titanium Dioxide (TIO2)-Reduced Graphene Oxide (R-GO) Composite", Sensors & Diagnostics, Jun. 20, 2023 (Jun. 20, 2023), pp. 1215-127, vol. 2., Royal Society of Chemistry.

Shokoufeh Sirjani, Ali Fattah, And Hamid Haratizadeh, "Effect of Electrode Shape on the Performance of ZnO-Based Ethanol Sensor", Journal of Sensors, Apr. 23, 2024 (Apr. 23, 2024), pp. 1-10, vol. 2024, Article ID 6696108, Hindawi.

* cited by examiner 100
1
21a
21
22
22a
2a
211
221
G
G'
G"

LACTIC ACID DETECTION ELECTRODE AND METHOD FOR PRODUCING THE SAME

CROSS-REFERENCE TO RELATED PATENT APPLICATION

This application claims the benefit of priority to Taiwan Patent Application No. 113137228, filed on Sep. 30, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a biological detection electrode, and more particularly to a lactic acid detection electrode and a method for producing the same.

BACKGROUND OF THE DISCLOSURE

Chronic kidney disease (CKD) is a serious chronic illness that often progresses silently until reaching advanced stages. Therefore, only through screening procedures can early-stage pathology be identified and allow for slowing of the progression of the disease. Approximately 5% of the global population is affected by chronic kidney disease. Therefore, developing a non-invasive, easy-to-use, and cost-effective solution for diagnosing kidney pathology is crucial.

Currently, tests for checking whether a patient has kidney disease include blood tests and lactic acid (LA) tests. Lactic acid measurement plays an important role in biological detection since lactic acid production is closely related to pathologies, such as shock, respiratory failure, and heart disease. Lactic acidosis is a metabolic acidosis that occurs when the body cannot adapt to the production or utilization of lactic acid. Non-enzymatic lactic acid biosensors have received widespread attention due to their advantages, but also have some drawbacks, such as low reliability due to biodegradation and higher costs. In recent years, biosensors for various metabolites have been developed and used for monitoring. Lactic acid is an essential biomolecule throughout the human body, with a normal blood lactic acid concentration ranging from 0.4 mmol/L to 1.2 mmol/L. The lactic acid concentration in human sweat (which is also present in the blood) is 4 mM to 25 mM when resting, and can reach over 50 mM after intense exercise. Therefore, creating a low-cost lactic acid measurement technology is crucial.

SUMMARY OF THE DISCLOSURE

In response to the above-referenced technical inadequacies, the present disclosure provides a lactic acid detection electrode and a method for producing the same.

In one aspect, the present disclosure provides a lactic acid detection electrode including a substrate and an electrode pattern.

The electrode pattern is formed on the substrate, and the electrode pattern at least partially exposes a surface of the substrate. The surface of the electrode pattern has a surface modification structure, and the surface modification structure has a p-n heterojunction that is formed between a reduced graphene oxide and a metal oxide; in which a conductivity type of the reduced graphene oxide is p-type, and a conductivity type of the metal oxide is n-type. The electrode pattern at least includes a first electrode having a first spiral line and a second electrode having a second spiral line. The first spiral line and the second spiral line respectively extend toward each other along a spiral path, and the first spiral line and the second spiral line are spirally wound around each other and spaced apart without contacting each other.

In another aspect, the present disclosure provides a method for producing a lactic acid detection electrode that includes a film layer formation step, a surface modification step, and a pattern formation step.

The film layer formation step includes forming a composite material film layer on a substrate, and the composite material film layer contains a graphene oxide (GO) and a metal oxide.

The surface modification step includes performing a first laser process on a surface of the composite material film layer using an ultrafast laser to form a surface modification structure on the substrate. The surface modification structure has a p-n heterojunction that is formed between a reduced graphene oxide and the metal oxide.

The reduced graphene oxide is reduced from the graphene oxide, a conductivity type of the reduced graphene oxide is p-type, and a conductivity type of the metal oxide is n-type.

The pattern formation step includes performing a second laser process using the ultrafast laser to at least partially cut and remove the surface modification structure to partially expose the substrate, thereby forming an electrode pattern, in which a surface of the electrode pattern has the surface modification structure.

The electrode pattern at least includes a first electrode and a second electrode, the first electrode has a first spiral line, and the second electrode has a second spiral line. The first spiral line and the second spiral line respectively extend toward each other along a spiral path, and the first spiral line and the second spiral line are spirally wound around each other and spaced apart without contacting each other.

Therefore, the lactic acid detection electrode and the method for producing the same provided by the present disclosure have advantages of simple manufacturing, low cost, and high sensitivity. By performing surface modification using an ultrafast laser and laser patterning the surface-modified film into an electrode pattern, efficiency of electrochemical reaction measurement of different lactic acid concentrations can be improved. The lactic acid detection electrode of the present disclosure has good application potential in wearable biosensors and other nanostructure fabrications, and possesses high sensitivity and high stability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
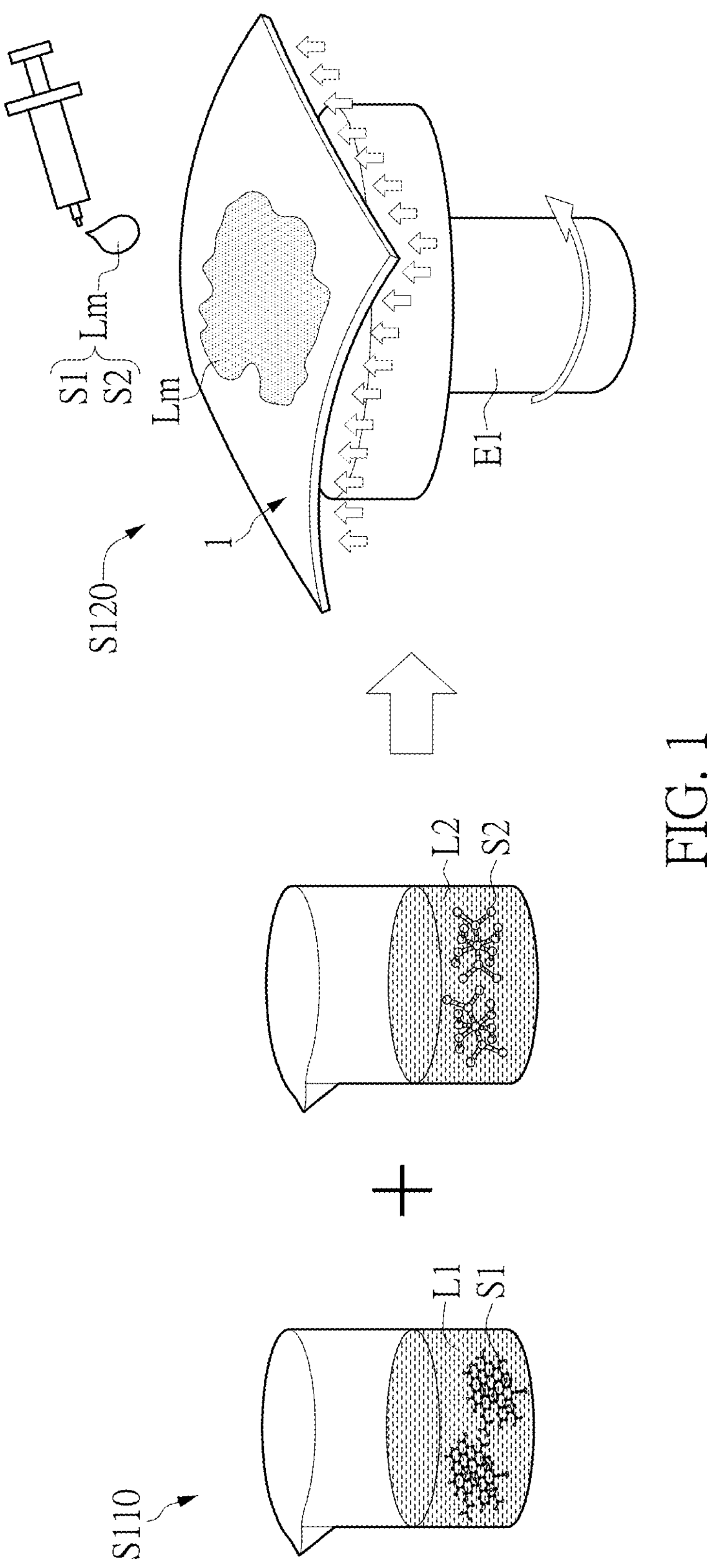
FIG. 1, FIG. 2 and FIG. 3 are flowcharts of a method for producing a lactic acid detection electrode according to an embodiment of the present disclosure.
Figure 2:
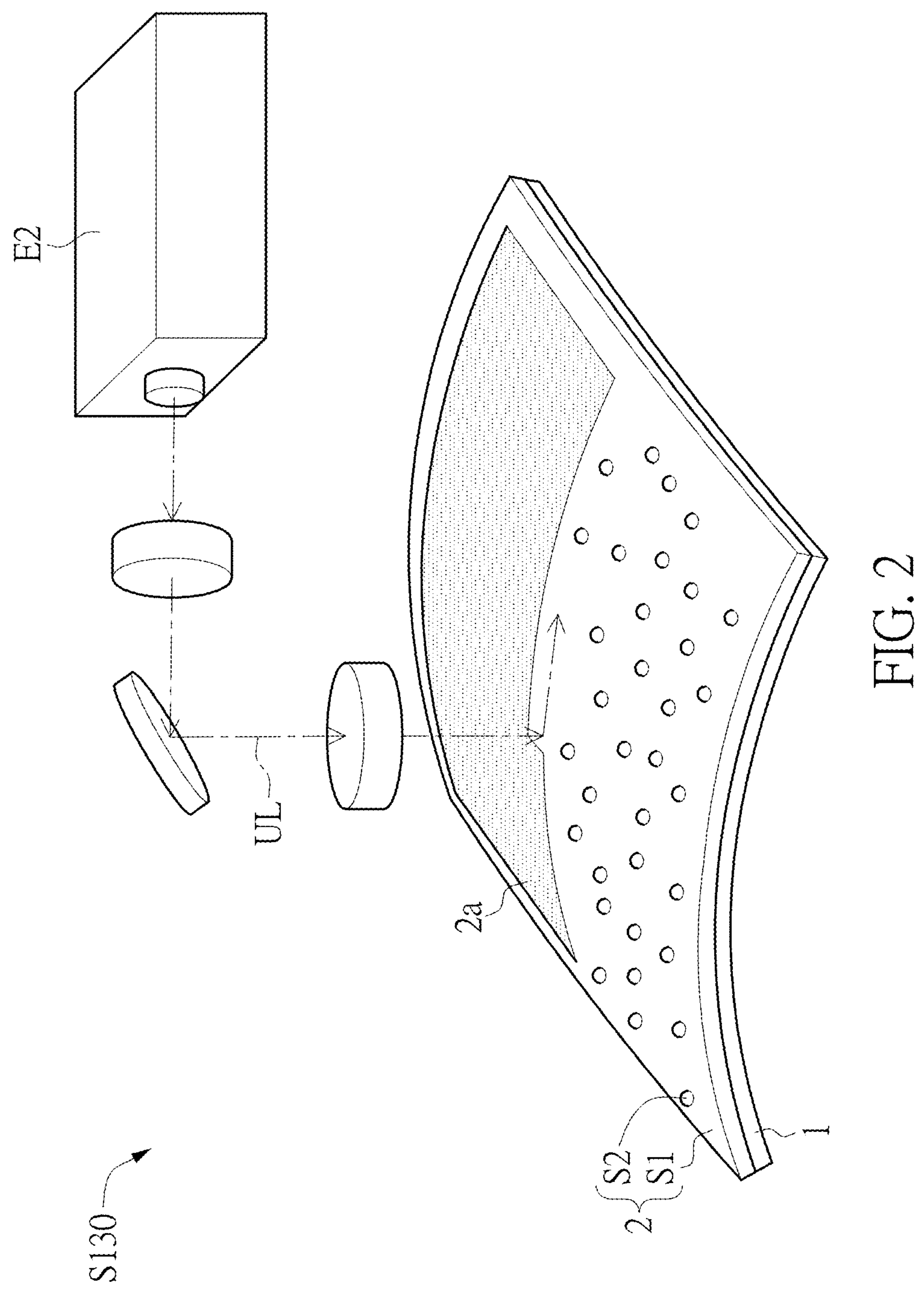

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIGS. 1 to 4, an embodiment of the present disclosure provides a lactic acid detection electrode 100 and a method for producing the same. The method includes step S110, step S120, step S130, and step S140. It should be noted that the sequence of steps and the actual operation methods described in the present embodiment can be adjusted as needed and are not limited to those described in the present embodiment.

Step S110 is a solution preparation step, which includes mixing a first liquid L1 containing graphene oxide S1 (GO) and a second liquid L2 containing metal oxide S2 to form a mixed liquid Lm. That is, the mixed liquid Lm contains the graphene oxide S1 and the metal oxide S2.

More specifically, the first liquid L1 is a dispersed aqueous solution containing the graphene oxide S1. The second liquid L2 is a dispersed aqueous solution containing the metal oxide S2. The metal oxide S2 is titanium dioxide (TiO2), but the present disclosure is not limited thereto.

In the present embodiment, a content of the graphene oxide S1 in the first liquid L1 is 0.2 mg/ml to 6 mg/ml (e.g., 1 mg/ml), and the graphene oxide S1 is in a sheet shape, which can be a single-layer sheet structure or a multi-layer sheet structure. The second liquid L2 can be formed by mixing, for example, 40 mg to 100 mg (e.g., 80 mg) of titanium dioxide powders with 10 ml to 50 ml (e.g., 30 ml) of an alcohol-containing aqueous solution (e.g., 40% to 50% of ethanol aqueous solution). The mixed liquid Lm is formed by mixing the first liquid L1 (i.e., the dispersed aqueous solution containing the graphene oxide S1) and the second liquid L2 (i.e., the dispersed aqueous solution containing the metal oxide S2) according to a volume ratio of 1:2 to 2:1.

Step S120 is a film layer formation step, which includes applying the mixed liquid Lm onto a substrate 1 to form a composite material film layer 2 containing the graphene oxide S1 and the metal oxide S2 on the substrate 1. The metal oxide S2 (e.g., titanium dioxide) has a first crystal phase, and the first crystal phase is an anatase phase. In the present embodiment, for convenience of description, the composite material formed by mixing the graphene oxide S1 and the metal oxide S2 (e.g., titanium dioxide) is represented as $TiO_2$@GO, but the present disclosure is not limited thereto.

More specifically, the film layer formation step includes: placing the substrate 1 on a coater E1 (e.g., a spin coater), and applying the mixed liquid Lm containing the graphene oxide S1 and the metal oxide S2 onto the substrate 1 by titration. Then, through the rotation of coater E1, followed by heating and drying of the mixed liquid Lm, a composite material film layer 2 is formed on substrate 1. The conditions for heating and drying can be, for example, baking the mixed liquid Lm at a heating temperature of 40° C. to 80° C. for 30 minutes to 90 minutes to remove the liquid components from the graphene oxide S1 and the metal oxide S2, thereby forming the composite material film layer 2.

It is worth mentioning that, in the present embodiment, after drying and sedimentation, the graphene oxide S1 forms a continuous lamellar structure (e.g., a continuous sheet-like structure) on the substrate 1, and the metal oxide S2 (e.g., titanium dioxide) is dispersed in granular form on the graphene oxide S1 having the continuous lamellar structure, but the present disclosure is not limited thereto.

Furthermore, the substrate 1 is a flexible polymer substrate, which facilitates the application of the prepared element in products requiring flexibility (e.g., wearable biosensors).

In some embodiments of the present disclosure, the substrate 1 can be a flexible polymer substrate such as a polyimide (PI) substrate, a polyethylene (PE) substrate, a polydimethylsiloxane (PDMS) substrate, a polyethylene terephthalate (PET) substrate, a polyethylene naphthalate (PEN) substrate, a polyamide (PA) substrate, or a polycarbonate (PC) substrate. Preferably, the substrate 1 is a polyimide (PI) substrate, but the present disclosure is not limited thereto. A thickness of the substrate 1 is between 60 micrometers and 90 micrometers, and preferably between 70 micrometers and 80 micrometers. Furthermore, a thickness of the composite material film layer 2 is between 1 micrometer and 10 micrometers, and preferably between 4 micrometers and 5 micrometers.

Step S130 is a surface modification step, which includes performing a first laser process by using an ultrafast laser UL emitted by a laser unit E2 to induce a crystal phase transformation on a surface of the composite material film layer 2, such that the metal oxide S2 (e.g., titanium dioxide) in the composite material film layer 2 is at least partially transformed to a second crystal phase from the first crystal phase (i.e., the anatase phase), in which the second crystal phase is a rutile phase, and the graphene oxide (GO) is reduced to reduced graphene oxide (rGO).

Accordingly, a surface modification structure 2*a* is finally formed on the substrate 1. That is, the surface modification structure 2*a* has a dual crystal phase structure composed of the first crystal phase (i.e., the anatase phase) and the second crystal phase (i.e., the rutile phase), and further has a structure mixed with the reduced graphene oxide (rGO).

More specifically, a conductivity type of the reduced graphene oxide (rGO) is p-type, a conductivity type of the metal oxide (e.g., titanium dioxide) is n-type, and the surface modification structure 2*a* has a p-n heterojunction formed between the p-type reduced graphene oxide (rGO) and the n-type metal oxide (titanium dioxide). Accordingly, the sensitivity of the material can be increased.

Furthermore, the ultrafast laser UL refers to a laser light source with short pulse duration in a range of femtoseconds (fs, $10^{-15}$ seconds) to picoseconds (ps, $10^{-12}$ seconds).

In the present embodiment, the ultrafast laser UL is preferably a femtosecond laser. The laser processing conditions for surface modification of the surface of the composite material film layer 2 by the ultrafast laser UL include: a laser wavelength between 1,030 nm and 1,050 nm (preferably 1,040 nm), a maximum output power between 11 W and 13 W (preferably 12 W), and an energy density between 0.50 J/cm$^2$ and 0.75 J/cm$^2$ (preferably 0.61 J/cm$^2$).

Additionally, the laser processing conditions further include a theoretical spot diameter between 13 μm and 17 μm (preferably 15 μm), a scanning speed between 900 mm/s and 1,100 mm/s (preferably 1,000 mm/s), and a repetition rate between 90 kHz and 110 kHz (preferably 100 kHz). Further, a scanning area of the laser processing conditions is 15 to 25 mm×15 to 25 mm (preferably 20 mm×20 mm).

The above are the operating conditions under which the ultrafast laser UL can induce the crystal phase transformation of titanium dioxide on the surface of the composite material and reduce graphene oxide, but the present disclosure is not limited thereto.

Figure 3:
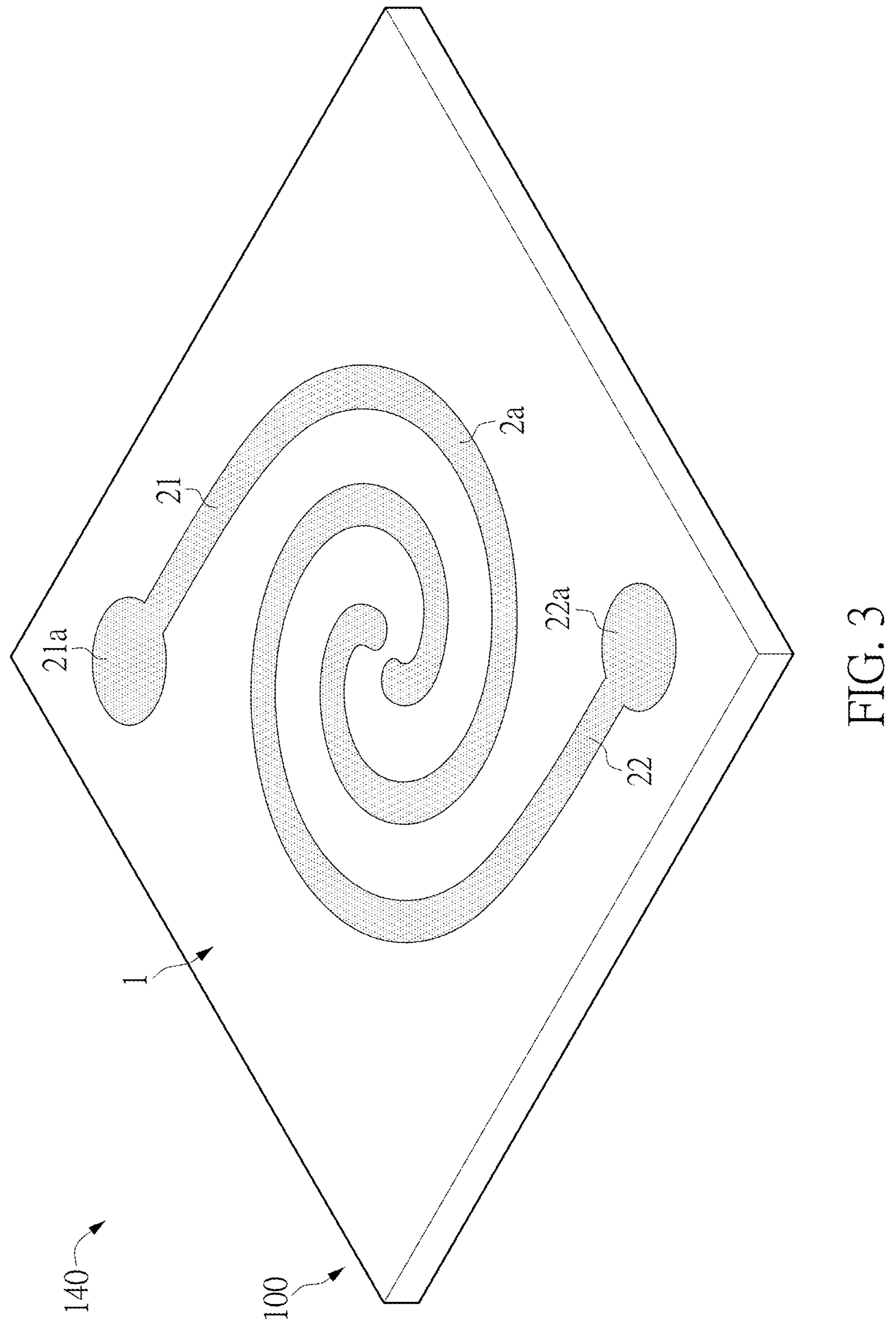

As shown in FIG. 3, step S140 is a pattern formation step, which includes further performing a second laser process by using the ultrafast laser UL to at least partially cut and remove the composite material film layer 2 and the surface modification structure 2*a* on the substrate 1, thereby forming an electrode pattern, which completes the preparation of the lactic acid detection electrode 100. In the present embodiment, the laser energy density in the pattern formation step (i.e., step S140) is greater than the laser energy density in the surface modification step (i.e., S130).

Specifically, a first laser energy density in the surface modification step (i.e., S130) is between 0.50 J/cm$^2$ and 0.75 J/cm$^2$ (e.g., 0.61 J/cm$^2$). Further, a second laser energy density in the pattern formation step (i.e., step S140) is greater than 0.65 J/cm$^2$, and preferably between 0.8 J/cm$^2$ and 0.9 J/cm$^2$ (e.g., 0.86 J/cm$^2$), so as to effectively remove the composite material film layer 2 and the surface modification structure 2*a* from the substrate 1.

It is worth mentioning that the electrode pattern is the pattern that remains after laser cutting. Therefore, a surface of the electrode pattern has the surface modification structure 2*a*. In other words, the surface of the electrode pattern has the dual crystal phase structure composed of the anatase phase and the rutile phase, and further has the structure mixed with the reduced graphene oxide. Additionally, the electrode pattern has the p-n heterojunction formed between the p-type reduced graphene oxide and the n-type metal oxide.

Figures 4A, 4B, 4C, 4D:
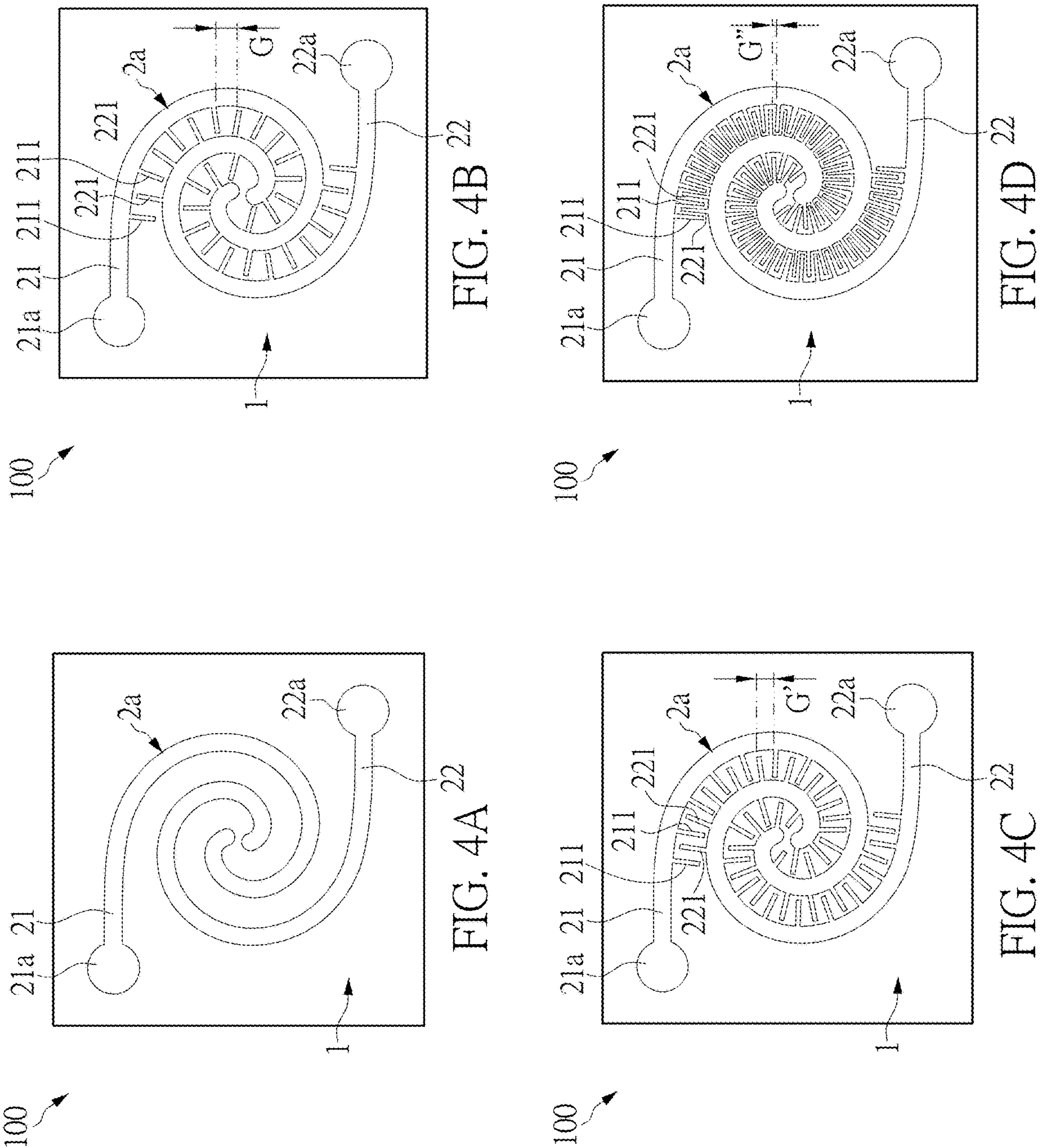
FIG. 4A, FIG. 4B, FIG. 4C and FIG. 4D show different designs of electrode patterns according to the embodiment of the present disclosure.

Referring to FIG. 4A, FIG. 4A shows an electrode pattern according to an embodiment of the present disclosure, which can improve the response and detection sensitivity of lactic acid detection. The electrode pattern includes a first electrode and a second electrode, and each of the first electrode and the second electrode is in a spiral shape.

The first electrode has a first electrode terminal 21*a* in a circular shape and a first spiral line 21 that extends from the first electrode terminal 21*a*. Further, the second electrode has a second electrode terminal 22*a* in a circular shape and a second spiral line 22 that extends from the second electrode terminal 22*a*.

The first spiral line 21 of the first electrode and the second spiral line 22 of the second electrode respectively extend from the first electrode terminal 21*a* and the second electrode terminal 22*a* along a spiral path toward each other. The first spiral line 21 of the first electrode and the second spiral line 22 of the second electrode are spirally intertwined and spaced apart from each other without contacting each other, so as to form a double-spiral pattern.

FIG. 4B to FIG. 4D show other variations of the electrode patterns according to some embodiments of the present disclosure. A common feature of the electrode patterns is that a plurality of first electrode fingers 211 are further formed on a first spiral sidewall of the first spiral line 21 of the first electrode, and are arranged along the spiral path and spaced apart from each other. Additionally, a plurality of second electrode fingers 221 are formed on a second spiral sidewall of the second spiral line 22 of the second electrode facing toward the first spiral line 21, and are arranged along the spiral path and spaced apart from each other.

The plurality of first electrode fingers 211 and the plurality of second electrode fingers 221 are interdigitated with each other without contact. Furthermore, the plurality of first electrode fingers 211 do not contact the second spiral line 22, and the plurality of second electrode fingers 221 do not contact the first spiral line 21.

Furthermore, an interdigitated spacing G, G', G" is defined between each of the first electrode fingers 211 and an adjacent one of the second electrode fingers 221.

The differences among FIG. 4B to FIG. 4D are that the interdigitated spacings G, G', G" between each of the first electrode fingers 211 and the adjacent one of the second electrode fingers 221 shown in FIG. 4B to FIG. 4(D) are different from each other. The interdigitated spacings G, G', G" can be, for example, between 0.2 mm and 1.8 mm, and preferably between 0.5 mm and 1.5 mm.

For example, in FIG. 4B, the interdigitated spacing G between the first electrode finger 211 and the adjacent second electrode finger 221 is 1.5 mm. In FIG. 4C, the interdigitated spacing G' between the first electrode finger 211 and the adjacent second electrode finger 221 is 1.0 mm. In FIG. 4D, the interdigitated spacing G" between the first electrode finger 211 and the adjacent second electrode finger 221 is 0.5 mm.

That is, when the values of the interdigitated spacings G, G', G" decrease, the plurality of first electrode fingers 211 and the plurality of second electrode fingers 221 have a closer arrangement with each other. In the present embodiment, the arrangement between the plurality of first electrode fingers 211 and the plurality of second electrode fingers 221 in FIG. 4D is the closest among the electrode patterns in FIG. 4A to FIG. 4D, which can provide well sensing response and detection sensitivity for lactic acid detection, as shown in FIG. 6E and FIG. 6F.

The above technical solution involves a method of surface modification of the $TiO_2$@GO composite material using an ultrafast laser, which includes partially transforming titanium dioxide from the anatase phase to the rutile phase. The method has the advantages of high yield, environmental friendliness, and rapid processing.

The surface modification structure 2*a* that has a mixed structure of p-type rGO and n-type $TiO_2$ forms a p-n heterojunction, thereby enhancing the sensing response of the material and facilitating the improvement of the sensitivity of the lactic acid detection sensor.

The lactic acid detection electrode 100 prepared by the above step S140 includes a flexible substrate 1 and a composite material film layer 2 formed on the substrate 1. The composite material film layer 2 is processed by the ultrafast laser UL to form the surface modification structure 2*a* and the electrode pattern derived from the surface modification structure 2*a* through a second laser process by the ultrafast laser UL.

The spiral structure design of the electrode pattern provides a large sensing surface area within a limited space, thereby enhancing sensing efficiency. Additionally, the surface modification structure 2*a* that includes $TiO_2$ and rGO on the surface of the electrode pattern further enhances the photoelectric performance and stability of the electrodes. The design is suitable for lactic acid detectors requiring high sensitivity and high stability.

Figure 5:
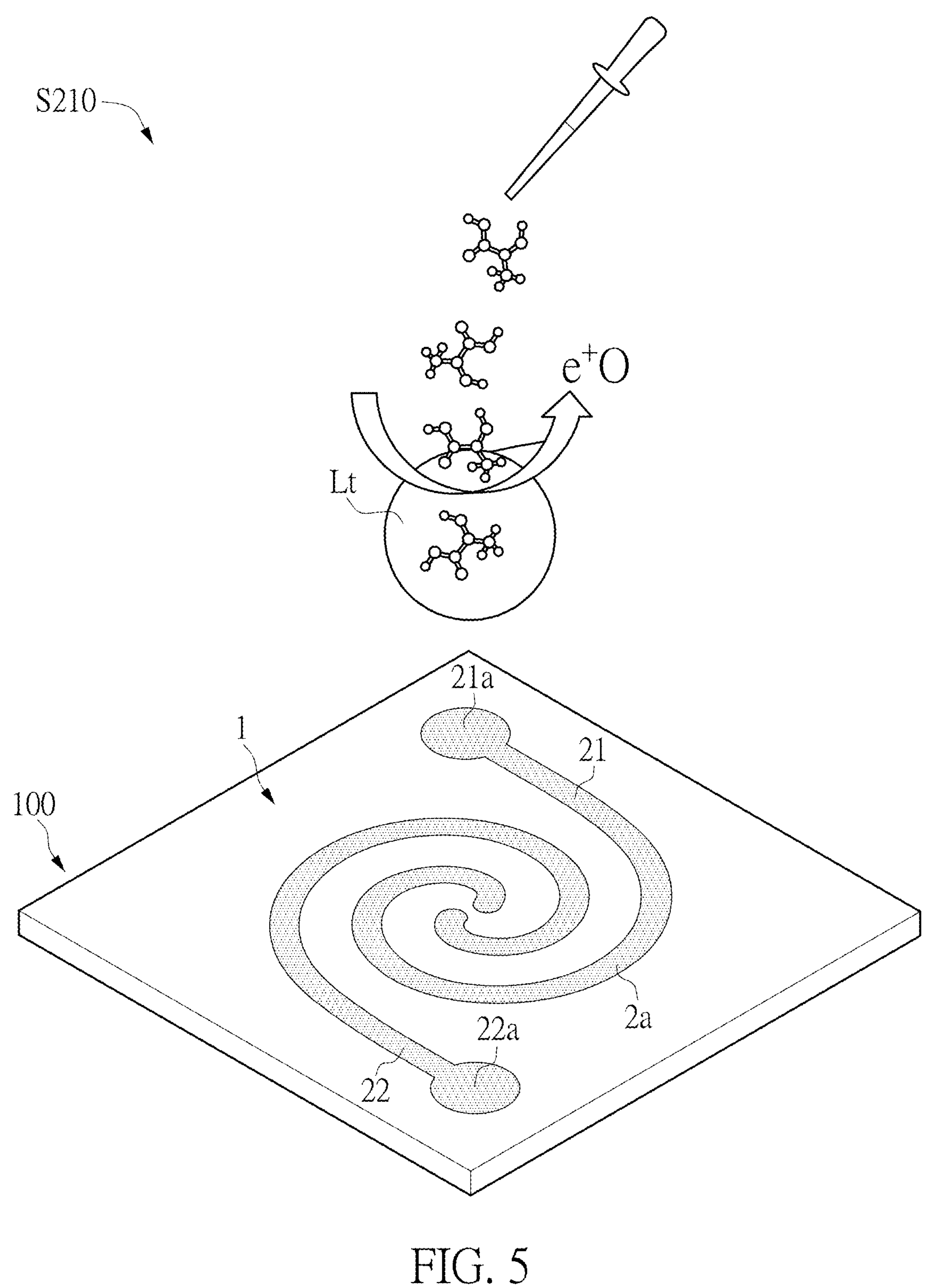
FIG. 5 is a schematic diagram showing a detection step of the lactic acid detection electrode according to the embodiment of the present disclosure.

To verify the biological detection capability of the lactic acid detection electrode 100, the lactic acid detection electrode 100 of the present embodiment can be verified through a method for evaluating biological detection capability as shown in FIG. 5, which includes step S120.

Step S120 is a detection step that includes dropping a detection liquid Lt onto the surface modification structure 2*a* of the lactic acid detection electrode 100 to evaluate biological detection capability of the lactic acid detection electrode 100. In the present embodiment, the detection step is to detect lactic acid (LA).

The detection liquid Lt is a buffered saline aqueous solution and contains lactic acid at a predetermined molar concentration. In the present embodiment, the buffered saline aqueous solution is phosphate-buffered saline (PBS), and a pH value of the buffered saline aqueous solution is between 7.2 and 7.6 (preferably 7.4). Additionally, the lactic acid is diluted with the buffered saline aqueous solution. The predetermined molar concentration of lactic acid ranges from 2 μM to 10 μM.

In the present embodiment, the detection step can, for example, include preparing a plurality of detection liquids Lt with different predetermined molar concentrations of lactic acid (e.g., 2 μM, 4 μM, 6 μM, 8 μM, and 10 μM), and sequentially dropping the detection liquids Lt with different predetermined molar concentrations of lactic acid onto the surface modification structure 2*a* at different times in an order from low concentration to high concentration, and observing the change in current over time to evaluate the sensing response and detection sensitivity of the lactic acid detection electrode 100 for lactic acid.

Specifically, the method for evaluating the biological detection capability of the present embodiment adopts a Keithley power supply to set a voltage of 1 V and measures the effect of detection solutions with different lactic acid concentrations on current variations. The method includes preparing lactic acid solutions with different lactic acid concentrations, changing the lactic acid concentration every 30 seconds, and recording the current change. At the start of the experiment, a baseline current is measured, followed by the sequential addition of detection solutions with different lactic acid concentrations, and the current response at each concentration is recorded to generate a graph of current versus time. The effect of different concentrations on the current is analyzed to evaluate sensitivity, response time, and stability of the lactic acid detection electrode 100, and to determine the detection concentration range of the lactic acid detection electrode 100. The detection results are shown in FIG. 6A to FIG. 6F. However, the method for detecting the lactic acid detection electrode 100 in the present disclosure is not limited to the above method.

Figure 6C:
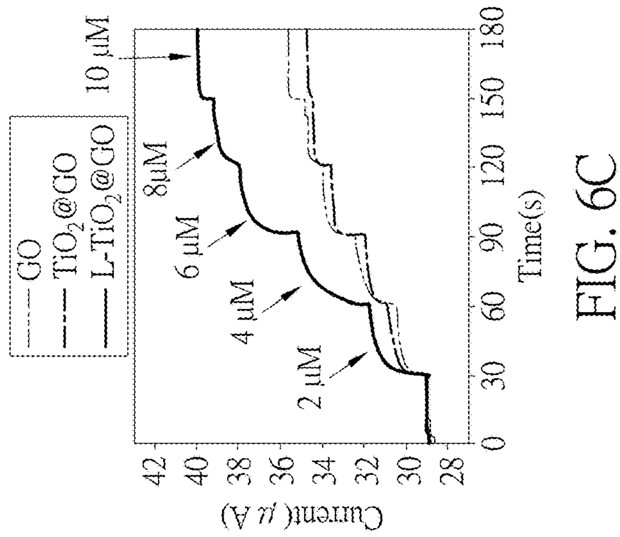
FIG. 6C shows the effect of different lactic acid concentrations on the different materials.
Figure 6B:
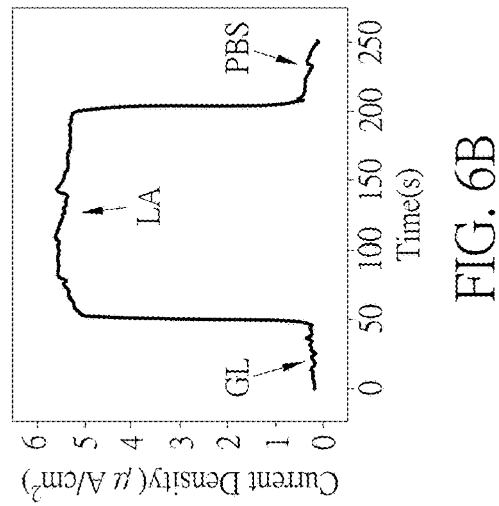
FIG. 6B shows the detection of LA (lactic acid), GL (glucose), and PBS using the L-$TiO_2$@GO composite film.
Figure 6A:
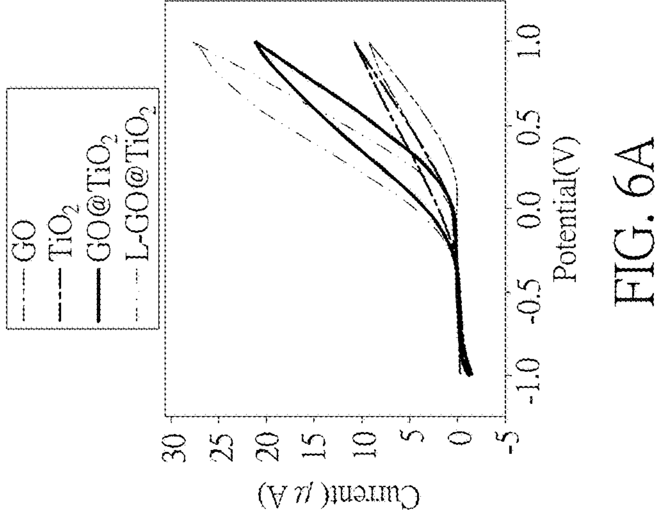
FIG. 6A is CV curves of the different materials in 1 M KOH aqueous solution at a scan rate of 200 $mVs^{-1}$ under steady-state conditions.
Figure 6F:
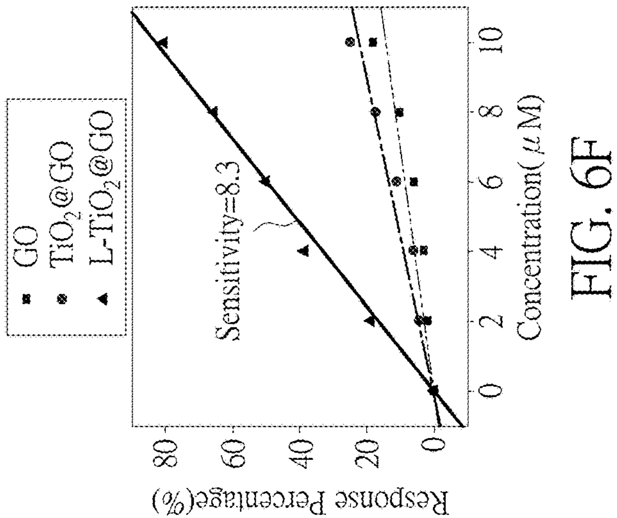
FIG. 6F shows the response value and sensitivity of the different material with the electrode pattern of FIG. 4D.
Figure 6E:
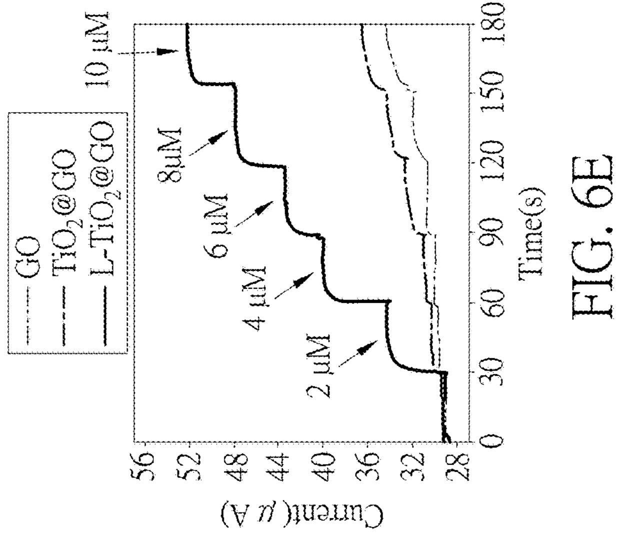
FIG. 6E shows the effect of different lactic acid concentrations on the different material with the electrode pattern of FIG. 4D.

FIG. 6A to FIG. 6F show the detection results of the electrochemical properties of different materials, including evaluating the electrochemical properties of different materials (e.g., GO, $TiO_2$, $TiO_2$@GO, L-$TiO_2$@GO) using cyclic voltammetry (CV). FIG. 6A is CV curves of different materials in 1 M KOH aqueous solution at a scan rate of 200 $mVs^{-1}$ under steady-state conditions. The CV curves of the materials show enclosed areas and the curves increase with the increase of potential. The L-GO@$TiO_2$ (also represented as L-$TiO_2$@GO) composite material has a significant current response. FIG. 6B shows the detection of LA (lactic acid), GL (glucose), and PBS using the L-GO@$TiO_2$ composite film. The results show that there is no electrical signal response when titrating glucose and PBS. When detecting LA, there is a significant current response, which can be attributed to the non-enzymatic sensor composed of the metal oxide and nanomaterials having a large surface area, capable of carrying a large amount of electroactive substances, and improving the electron and proton transfer processes. By generating current signals through specific reactions with lactic acid, the sensitivity and selectivity of the non-enzymatic sensor are further enhanced, thereby improving the catalytic performance and stability.

Figure 6D:
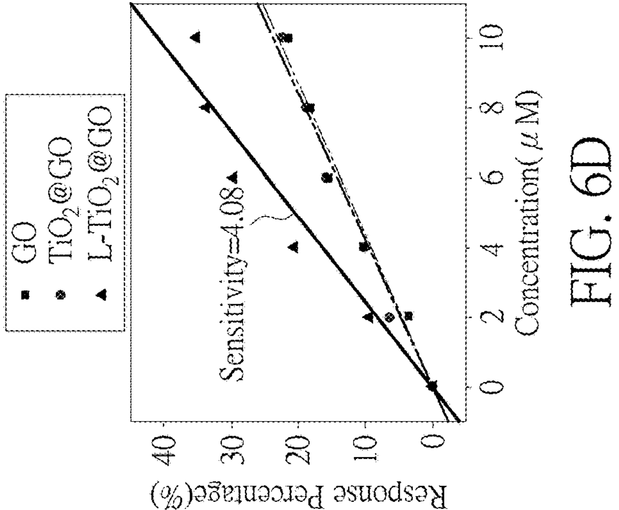
FIG. 6D shows the response value and sensitivity of the different material.

The embodiments of the present disclosure involve using different materials to prepare electrode-less resistive lactic acid (LA) sensors and continuously adding lactic acid with concentrations of 2 μM to 10 μM to investigate the response values and sensitivity. FIG. 6C shows the effect of different lactic acid concentrations on the material (e.g., the entire surface of the substrate 1 being covered with the surface modification structure 2*a*). As the lactic acid concentration increases, the peak current gradually increases. The electrocatalytic oxidation of lactic acid by the electrode can be attributed to the increased lactic acid concentration leading to more electron transfer. FIG. 6D shows the response value and sensitivity of the different material. The lactic acid sensor shows linear sensitivity to lactic acid concentrations from 2 μM to 10 μM, with an L-$TiO_2$@GO response value of 37.9% and sensitivity of 4.08.

To verify the effect of the spiral electrode pattern (as shown in FIG. 4D), a resistive LA sensor with spiral and interdigitated electrode structures is prepared. The current is changed with titrating different lactic acid concentrations. FIG. 6E shows the effect of different lactic acid concentrations on the material. As the lactic acid concentration increases, the current increases, which shows a trend similar to FIG. 6C. When the LA concentration increases to 10 μM, the current of the L-$TiO_2$@GO composite material is 52.1 μA. FIG. 6F shows the response value and sensitivity of the spiral and interdigitated electrode structure. The L-$TiO_2$@GO has a significantly improved response value and sensitivity, with a response value of 80.68% and a sensitivity of 8.30.

Figures 7A, 7B, 7C, 7D, 7E, 7F:
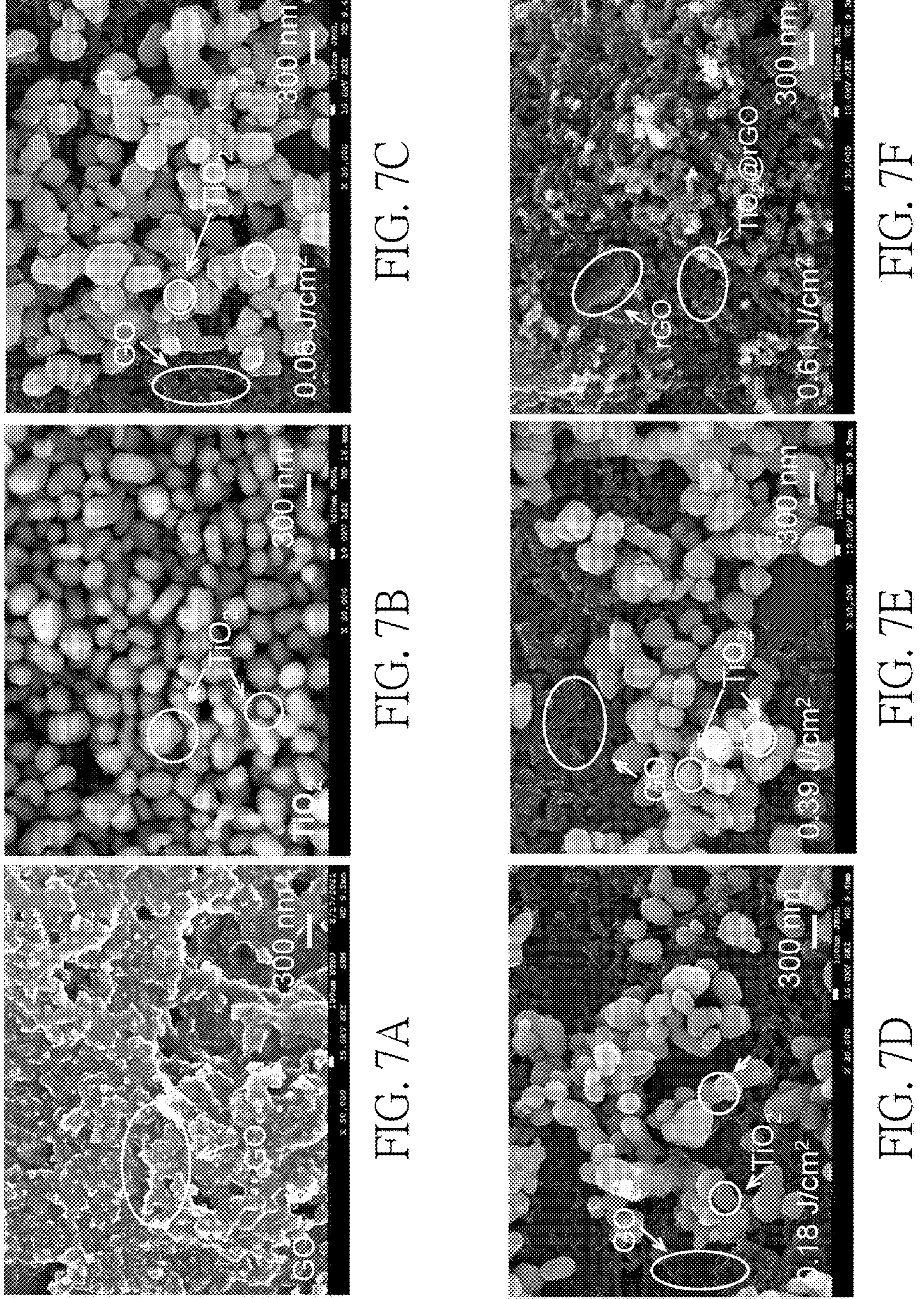
FIG. 7A, FIG. 7B, FIG. 7C, FIG. 7D, FIG. 7E and FIG. 7F show surface morphology photographs of the different materials under SEM according to the embodiment of the present disclosure.

Referring to FIG. 7A to FIG. 7F and FIG. 8A to FIG. 8F, FIG. 7A to FIG. 7F show surface morphology photographs of different materials taken under a scanning electron microscope (SEM). FIG. 7A shows the surface morphology of pure graphene oxide (GO) having lamellar structure (flake structure). FIG. 7B shows the surface morphology of pure titanium dioxide ($TiO_2$) particles. FIG. 7C shows the surface morphology of the $TiO_2$@GO composite film layer (i.e., $TiO_2$ particles distributed on GO flake structure) processed with a laser energy density of 0.06 J/cm$^2$. FIG. 7D shows the surface morphology of the $TiO_2$@GO composite film layer processed with an energy density of 0.18 J/cm$^2$. FIG. 7E shows the surface morphology of the $TiO_2$@GO composite film layer processed with an energy density of 0.39 J/cm$^2$. FIG. 7F shows the surface morphology of the $TiO_2$@GO composite film layer processed with an energy density of 0.61 J/cm$^2$ which can produce $TiO_2$@rGO. Additionally, FIG. 8A to FIG. 8F show the particle size distribution diagrams of titanium dioxide ($TiO_2$) particles respectively in FIG. 7A to FIG. 7F.

Figures 8A, 8B, 8C, 8D, 8E, 8F:
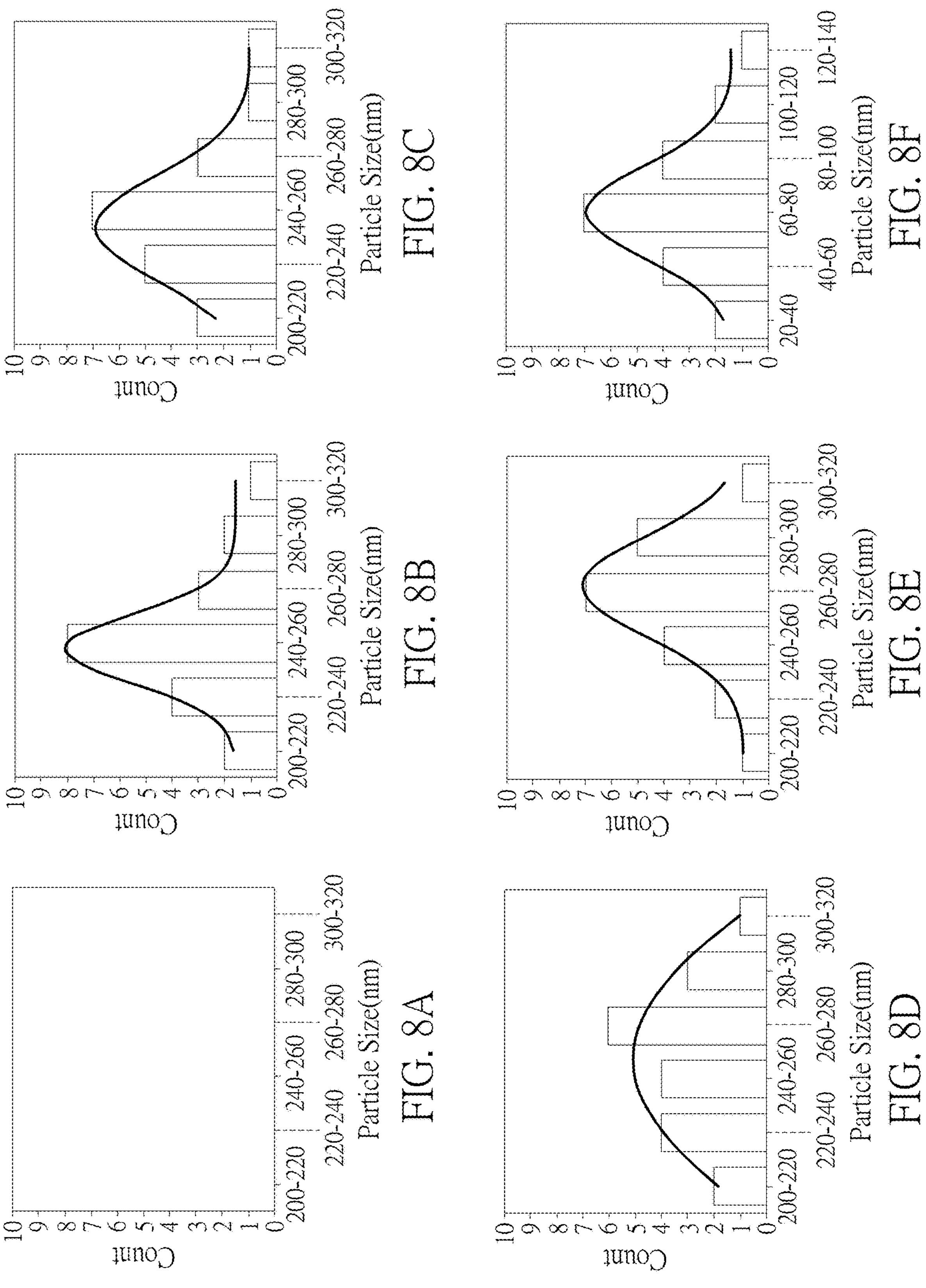
FIG. 8A, FIG. 8B, FIG. 8C, FIG. 8D, FIG. 8E and FIG. 8F show particle size distributions of titanium dioxide particles of the different materials according to the embodiment of the present disclosure.

FIG. 7A shows that the graphene oxide (GO) layer has a lamellar structure (flake structure), and partial folding and undulations on the surface of the GO layer can be observed. Since GO contains a large amount of oxygen-containing functional groups, an energy-dispersive X-ray spectroscopy (EDS) analysis shows that the contents of C and O are 53.68 wt % and 46.32 wt %, respectively (as shown in Table 1 below). FIG. 7B and FIG. 8B show that fine nanoparticles are observed on titanium dioxide ($TiO_2$). The interface of the titanium dioxide particles is unclear, and agglomeration of the titanium dioxide particles occurs, with an average particle size of about 247 nm. Additionally, the $TiO_2$ surface is composed of Ti and O elements, which are 44.45 wt % and 55.55 wt %, respectively. FIG. 7C and FIG. 8C show the $TiO_2$@GO composite material, where $TiO_2$ nanoparticles are uniformly distributed on the surface of the GO lamellar structure (flake structure), and an average particle size of the $TiO_2$ nanoparticles is about 238 nm. After mixing $TiO_2$ and GO, the elements of C, O, and Ti are 55.06 wt %, 25.43 wt %, and 19.51 wt %, respectively. FIG. 7C to FIG. 7E show that after laser ablation with an energy density of 0.06 to 0.39 J/cm$^2$, the $TiO_2$ nanoparticles are significantly reduced, with an average particle size of about 230 nm, and the surface presents a layered rGO and $TiO_2$ structure. In terms of component distribution, after laser processing of the $TiO_2$@GO film, the O and Ti elements decrease with increasing energy, while the C element increases significantly. FIG. 7F is the morphology after laser ablation at an energy density of 0.61 J/cm$^2$ on the $TiO_2$@GO surface. The surface clearly shows rGO and $TiO_2$. Compared with the $TiO_2$@GO morphology, the laser-processed L-$TiO_2$@GO (i.e., $TiO_2$@rGO) shows smaller grain sizes, with an average particle size between 60 nm to 90 nm (e.g., 78 nm). After laser processing, different morphologies are obtained, and both O and Ti decrease significantly, while the C content increases.

TABLE 1

| Group | C (wt %) | O (wt %) | Ti (wt %) |
|---|---|---|---|
| (A) | 53.68 | 46.32 | 0.00 |
| (B) | 0.00 | 55.55 | 44.45 |
| (C) | 55.06 | 25.43 | 19.51 |
| (D) | 65.89 | 22.16 | 11.95 |
| (E) | 67.54 | 21.13 | 11.33 |
| (F) | 68.32 | 19.87 | 11.80 |

The groups (C) to (F) of Table 1 show that as the energy density increases from 0.06 J/cm$^2$ to 0.61 J/cm$^2$, the carbon element (C) increases from 55.06 wt % to 68.32 wt %, the oxygen element (O) decreases from 25.43 wt % to 19.87 wt %, and the titanium element (Ti) decreases from 19.51 wt % to 11.80 wt %. The X-ray spectroscopy (EDS) analysis results indicate that increasing the laser energy density reduces the content of titanium dioxide ($TiO_2$) and converts graphene oxide to reduced graphene oxide (r-GO).

Figure 9B:
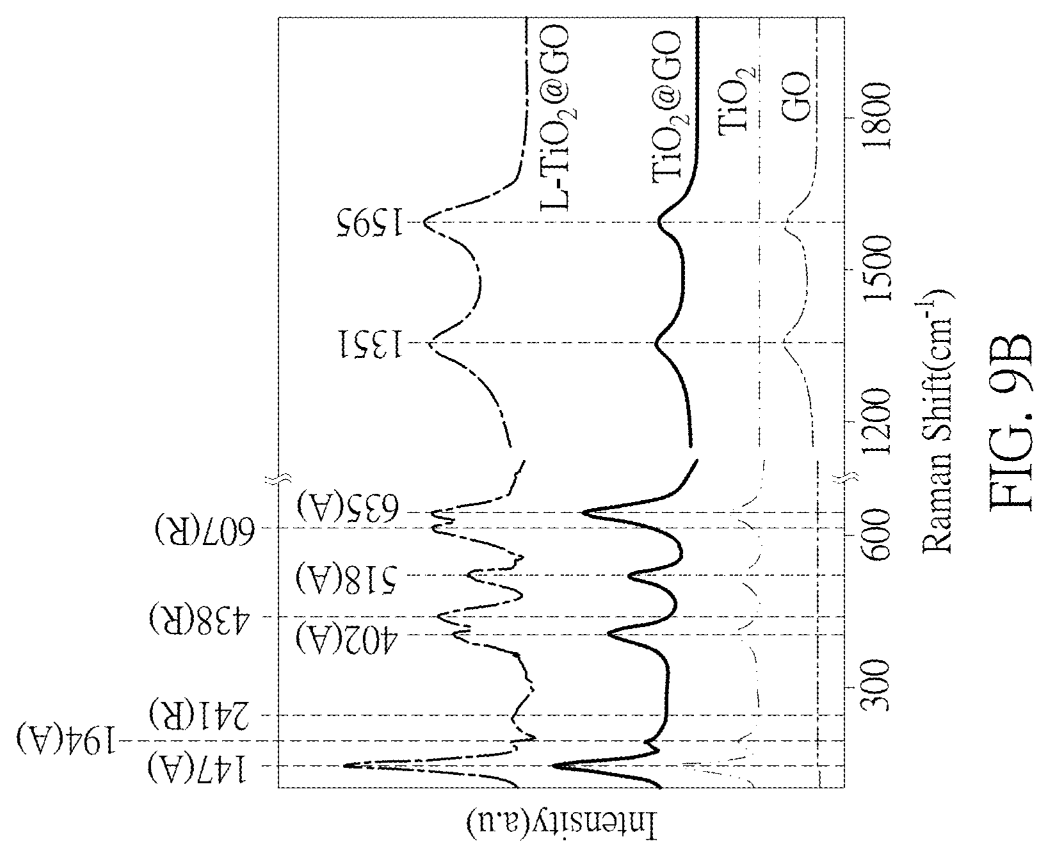
FIG. 9B shows Raman spectra of the different materials.
Figure 9A:
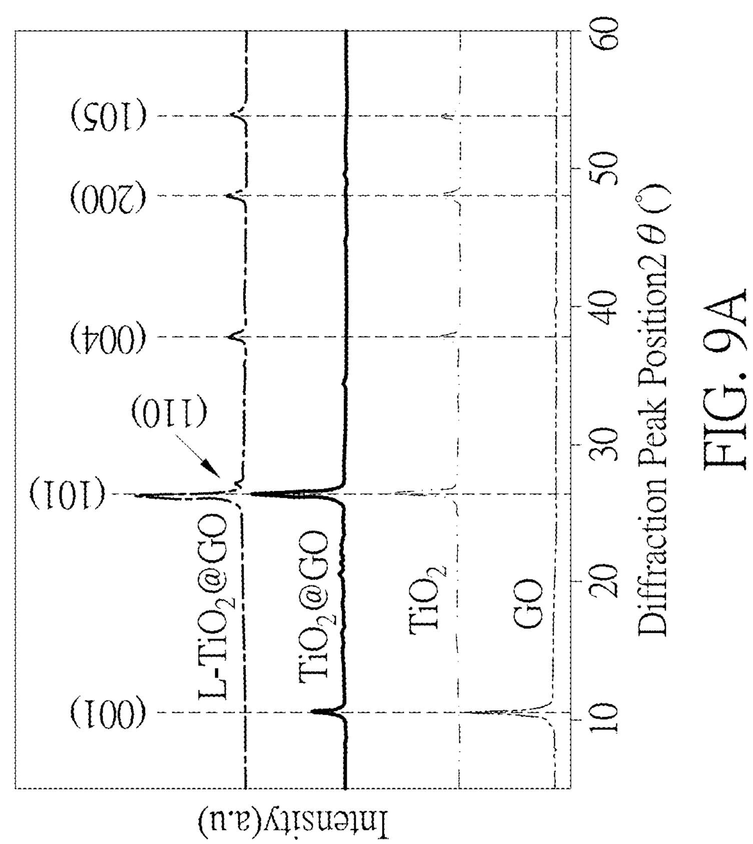
FIG. 9A shows X-ray diffraction spectra of the different materials.

FIG. 9A shows the X-ray diffraction (XRD) spectra of different materials, and FIG. 9B shows the Raman spectra of the different materials. FIG. 9A shows the crystallinity and lattice orientations of the different materials (e.g., GO, $TiO_2$, $TiO_2$@GO, and L-$TiO_2$@GO) obtained from the XRD spectra. The diffraction peaks of $TiO_2$ nanoparticles at 2θ angles of 26.4°, 37.8°, 48°, and 53.9° correspond to the (101), (004), (200), and (105) lattice orientations (lattice planes), confirming that the $TiO_2$ nanoparticles have the anatase phase. In the L-$TiO_2$@GO nanocomposite processed at 0.61 J/cm$^2$, rGO does not exhibit the corresponding characteristic peaks; when GO aqueous solution is mixed with $TiO_2$ aqueous solution, $TiO_2$ nanoparticles suppress the characteristic peaks of rGO.

Additionally, 2θ shifts to lower angles, changing from 26.45° to 26.2°, and the half-peak width increases from 0.37 to 0.52, which is attributed to changes in grain size due to laser scanning. It is worth noting that L-$TiO_2$@GO has an obvious peak at 26.2°, corresponding to the (110) lattice orientation (lattice plane), indicating the presence of the rutile phase and the anatase phase.

Raman spectroscopy is used to study the functional groups of GO, $TiO_2$, $TiO_2$@GO, and L-$TiO_2$@GO. The Raman spectrum of GO has two distinct peaks that include D band at 1351 cm$^{-1}$ and G band at 1595 cm$^{-1}$, with a defect intensity ratio (ID/IG) of 0.94. In addition to the above peaks, $TiO_2$@GO has main characteristic peaks at Alg (518 cm$^{-1}$), Blg (635 cm$^{-1}$), Blg (402 cm 1), Eg (635 cm$^{-1}$), Eg (147 $cm^{-1}$), and Eg (194 $cm^{-1}$), indicating that $TiO_2$ presents the anatase phase. Through laser-induced surface modification, the rutile phase intensity in L-$TiO_2$@GO increases, with corresponding peaks at 607(R), 438(R), and 241(R) $cm^{-1}$, proving the simultaneous presence of the anatase and the rutile phases. The corresponding peak intensities of the rutile phase at 607(R), 438(R), and 241(R) $cm^{-1}$ are slightly higher than the adjacent peak intensities corresponding to the anatase phase at 635(A), 402(A), and 194(A) $cm^{-1}$, indicating that the rutile phase is dominant. That is, the rutile phase is the primary crystal phase, and the anatase phase is the secondary crystal phase.

Figures 10A, 10B:
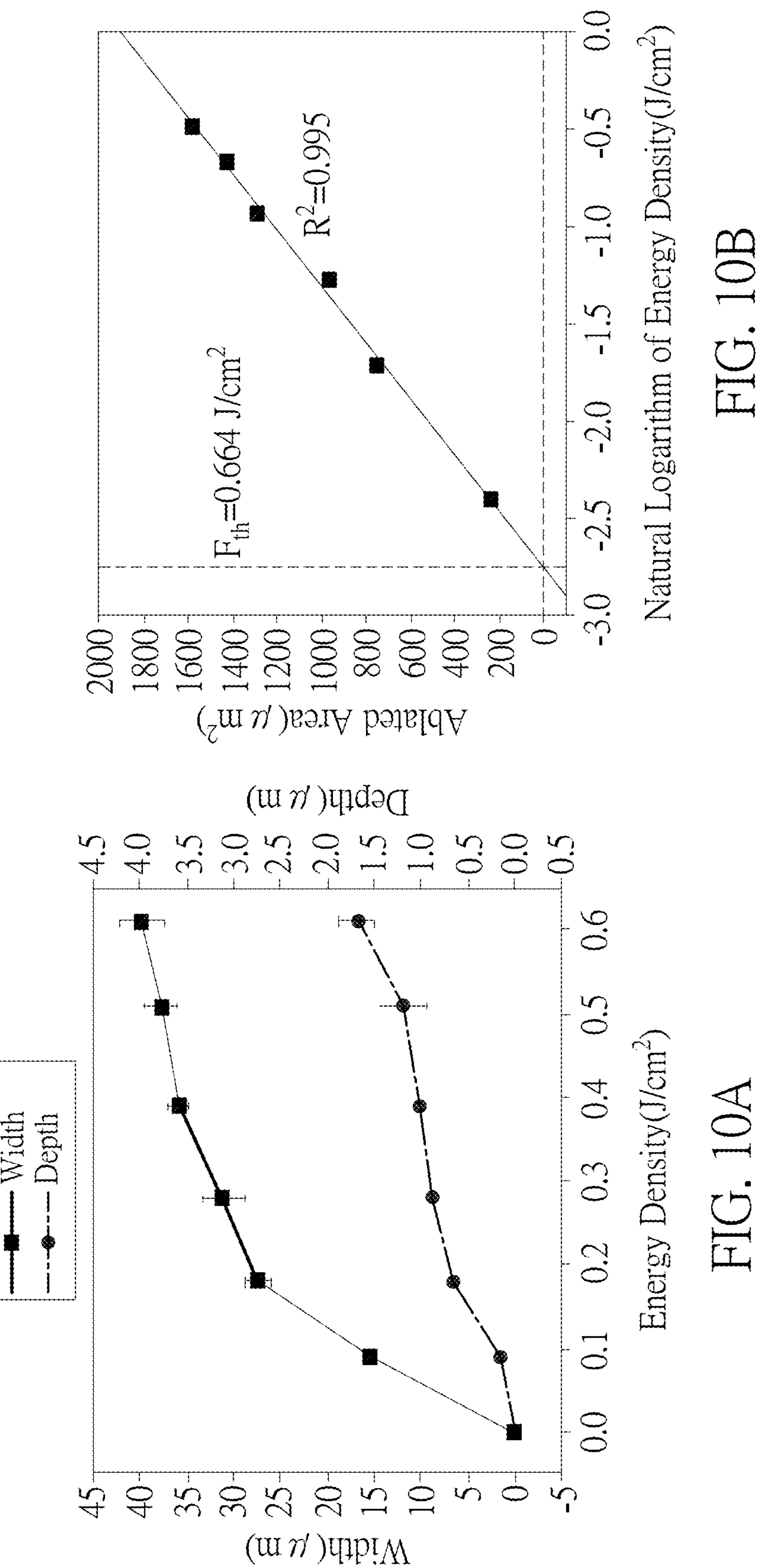
FIG. 10A shows the relationship between width and depth at different laser energy densities.
FIG. 10B shows effect of natural logarithm of energy density on ablation area according to the embodiment of the present disclosure.

FIG. 10A shows the relationship between the width and depth of direct-written $TiO_2$@GO composite films at different laser energy densities (J/$cm^2$), evaluated by drawing lines using a femtosecond laser with a wavelength of 1040 nm. The results show that as the energy density increases, the width and depth gradually increase. When the energy density is increased from 0.06 J/$cm^2$ to 0.39 J/$cm^2$, the width continues to increase. When the energy density is increased from 0.39 J/$cm^2$ to 0.61 J/$cm^2$, the width tends to level off, with a maximum width of about 39.5 μm. Similarly, as the energy density increases, the depth of the $TiO_2$@GO composite film gradually increases. When the energy density exceeds 0.61 J/$cm^2$, the $TiO_2$@GO layer is inferred to be ablated from the substrate. Due to the strong light absorption of $TiO_2$, a lower energy density can cause ablation.

By using the spatial intensity distribution of a Gaussian beam, the relationship between the ablation diameter and the critical threshold of $MoS_2$/rGO films can be derived. The relationship between different energy densities and $D^2$ is shown in FIG. 10B. By extrapolating the theoretical straight line, the ablation threshold Fth is obtained as 0.064 J/$cm^2$, and the regression analysis $R^2$ is 0.995, indicating high correlation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lactic acid detection electrode, comprising:
a substrate; and
an electrode pattern formed on the substrate, the electrode pattern at least partially exposing a surface of the substrate;
wherein the surface of the electrode pattern has a surface modification structure, and the surface modification structure has a p-n heterojunction that is formed between a reduced graphene oxide and a metal oxide, and wherein a conductivity type of the reduced graphene oxide is p-type, and a conductivity type of the metal oxide is n-type;
wherein the electrode pattern includes at least:
a first electrode having a first spiral line; and
a second electrode having a second spiral line;
wherein the first spiral line and the second spiral line respectively extend toward each other along a spiral path, and the first spiral line and the second spiral line are spirally wound around each other and spaced apart without contacting each other.

2. The lactic acid detection electrode according to claim 1, wherein a first spiral sidewall of the first spiral line is formed with a plurality of first electrode fingers arranged along the spiral path and spaced apart from each other, a second spiral sidewall of the second spiral line facing toward the first spiral line is formed with a plurality of second electrode fingers arranged along the spiral path and spaced apart from each other; wherein the plurality of first electrode fingers and the plurality of second electrode fingers are interdigitated with each other without contacting each other.

3. The lactic acid detection electrode according to claim 2, wherein, in the electrode pattern, an interdigitated spacing is defined between each of the first electrode fingers and an adjacent one of the second electrode fingers; wherein the interdigitated spacing is between 0.2 mm and 1.8 mm.

4. The lactic acid detection electrode according to claim 1, wherein the surface modification structure of the electrode pattern has a dual-phase crystal structure including an anatase phase and a rutile phase, and further has a structure mixed with the reduced graphene oxide.

5. The lactic acid detection electrode according to claim 1, wherein the substrate is a flexible polymer substrate, and the metal oxide is titanium dioxide.

6. A method for producing a lactic acid detection electrode, comprising:
a film layer formation step, which includes forming a composite material film layer on a substrate, the composite material film layer containing a graphene oxide (GO) and a metal oxide;
a surface modification step, which includes performing a first laser process on a surface of the composite material film layer using an ultrafast laser to form a surface modification structure on the substrate; wherein the surface modification structure has a p-n heterojunction formed between a reduced graphene oxide reduced from the graphene oxide and the metal oxide, and wherein a conductivity type of the reduced graphene oxide is p-type, and a conductivity type of the metal oxide is n-type; and
a pattern formation step, which includes performing a second laser process using the ultrafast laser to at least partially cut and remove the surface modification structure to partially expose the substrate, thereby forming an electrode pattern, wherein a surface of the electrode pattern has the surface modification structure;
wherein the electrode pattern at least includes a first electrode and a second electrode, the first electrode has a first spiral line, and the second electrode has a second spiral line; wherein the first spiral line and the second spiral line respectively extend toward each other along a spiral path, and the first spiral line and the second spiral line are spirally wound around each other and spaced apart without contacting each other.

7. The method according to claim 6, wherein, in the film layer formation step, the metal oxide in the composite material film layer has a first crystal phase, and the first crystal phase is an anatase phase.

8. The method according to claim 7, wherein, in the surface modification step, the ultrafast laser induces the metal oxide in the composite material film layer to be at least partially transformed from the first crystal phase to a second crystal phase, and reduces the graphene oxide to the reduced graphene oxide (rGO); and wherein the second crystal phase is a rutile phase.

9. The method according to claim 6, wherein, in the film layer formation step, the graphene oxide in the composite material film layer is formed on the substrate as a continuous lamellar structure, and the metal oxide is dispersed in granular form on the graphene oxide.

10. The method according to claim 6, wherein a laser energy density in the pattern formation step is greater than a laser energy density in the surface modification step.

* * * * *